United States Patent
Leon

(10) Patent No.: US 12,301,521 B2
(45) Date of Patent: May 13, 2025

(54) MESSAGE DATA PLACEHOLDERS FOR REPLACEMENT IN DATA ELEMENTS WITH STYLIZED COMPONENTS DURING MESSAGE COMMUNICATIONS

(71) Applicant: Brex Inc., Draper, UT (US)

(72) Inventor: Alexander Leon, Knoxville, TN (US)

(73) Assignee: Brex Inc., New York, NY (US)

( * ) Notice: Subject to any disclaimer, the term of this patent is extended or adjusted under 35 U.S.C. 154(b) by 0 days.

(21) Appl. No.: 18/458,051

(22) Filed: Aug. 29, 2023

(65) Prior Publication Data

US 2025/0080478 A1  Mar. 6, 2025

(51) Int. Cl.
*G06F 15/16* (2006.01)
*G06F 3/0482* (2013.01)
*H04L 51/02* (2022.01)
*H04L 51/04* (2022.01)

(52) U.S. Cl.
CPC ............ *H04L 51/02* (2013.01); *G06F 3/0482* (2013.01); *H04L 51/04* (2013.01)

(58) Field of Classification Search
CPC ........ H04L 51/02; H04L 51/04; G06F 3/0482
See application file for complete search history.

(56) References Cited

U.S. PATENT DOCUMENTS

| | | | | |
|---|---|---|---|---|
| 8,886,735 B1* | 11/2014 | Liu | ...................... | G06Q 10/107 715/752 |
| 2005/0278414 A1* | 12/2005 | Condo | ................... | G06Q 30/02 709/202 |
| 2024/0086633 A1* | 3/2024 | Chiu | ....................... | H04L 51/04 |

* cited by examiner

*Primary Examiner* — John B Walsh
(74) *Attorney, Agent, or Firm* — Perkins Coie LLP

(57) ABSTRACT

There are provided systems and methods for message data placeholders for replacement in data elements with stylized components during message communications. A service provider may provide communications and computing services to users. When communicating with users, electronic messages may be sent, such as emails to assist users with use of services of the service provider. The service provider may provide a message template manager, where users may utilize the manager to select message templates to construct messages. The users may add text data and syntax for placeholders, where the syntax may be executed by code or other logic to replace the placeholders with corresponding data from data sources. When replacing and inserting data to be rendered in messages, the data may be checked for whether the data is from a source that is trusted, and, if not, may be prevented from being rendered in the message.

17 Claims, 7 Drawing Sheets

FIG. 2A

302—Email Type * | Action Required

304—Template Version * | Informational | Action Required

MESSAGE DATA PLACEHOLDERS FOR REPLACEMENT IN DATA ELEMENTS WITH STYLIZED COMPONENTS DURING MESSAGE COMMUNICATIONS

TECHNICAL FIELD

The present application generally relates to addition and transmission of content in electronic messages, such as emails, and more specifically to using message templates and placeholders to automatically load data in such messages from trusted internal sources while blocking untrusted external sources.

BACKGROUND

Service provider systems may provide services to customer entities, such as businesses and companies, through computing systems and networks. These services may include computing services for digital accounts, credit and underwriting, expense management, and the like. When providing services to entities, different applications, websites, and/or online resources may be used, and communications may be provided through electronic messages including emails, instant messages, chat messages, pop-ups, push messages, and the like. Electronic messages may include content that is displayed to users when messages are opened, where such content may be loaded to and/or added by different data sources statically when a message is generated and/or dynamically when a message is opened or viewed. Conventionally, when electronic messages, such as emails, are sent with loaded content, the content or other data may be added directly to the message in one or more message fields or elements, such as by adding to a message body. However, this may be problematic as users, either internal or external, may add malicious, untrusted, or potentially harmful data in different elements that may cause fraud, computing attacks, revelation or collection of sensitive data, and the like. This may be done knowingly by fraudulent users but may also be performed unknowingly when systems and/or devices become compromised. Further, data that may be added to electronic messages transmitted to customers and/or provided to customers for transmission to other users may not be reviewed, vetted, and approved, which may cause unwanted, dangerous, or potentially damaging information to be shared or sent. Currently, solutions to these technical issues with adding data to electronic messages require manual efforts and review, which is time consuming, prone to errors, and difficult to enforce.

Therefore, there is a need to address deficiencies with conventional computing and electronic communication systems to provide centralized data review and management of data added to elements in electronic messages.

BRIEF DESCRIPTION OF THE DRAWINGS

FIGS. 2A and 2B are exemplary user interfaces for establishing a message having message data placeholders used to load data in data elements with stylized components, according to an embodiment;

FIGS. 3A and 3B are exemplary diagrams for menus and menu options for establishing an electronic message having message data placeholders used to load data in data elements with stylized components, according to an embodiment;

Figure 1:
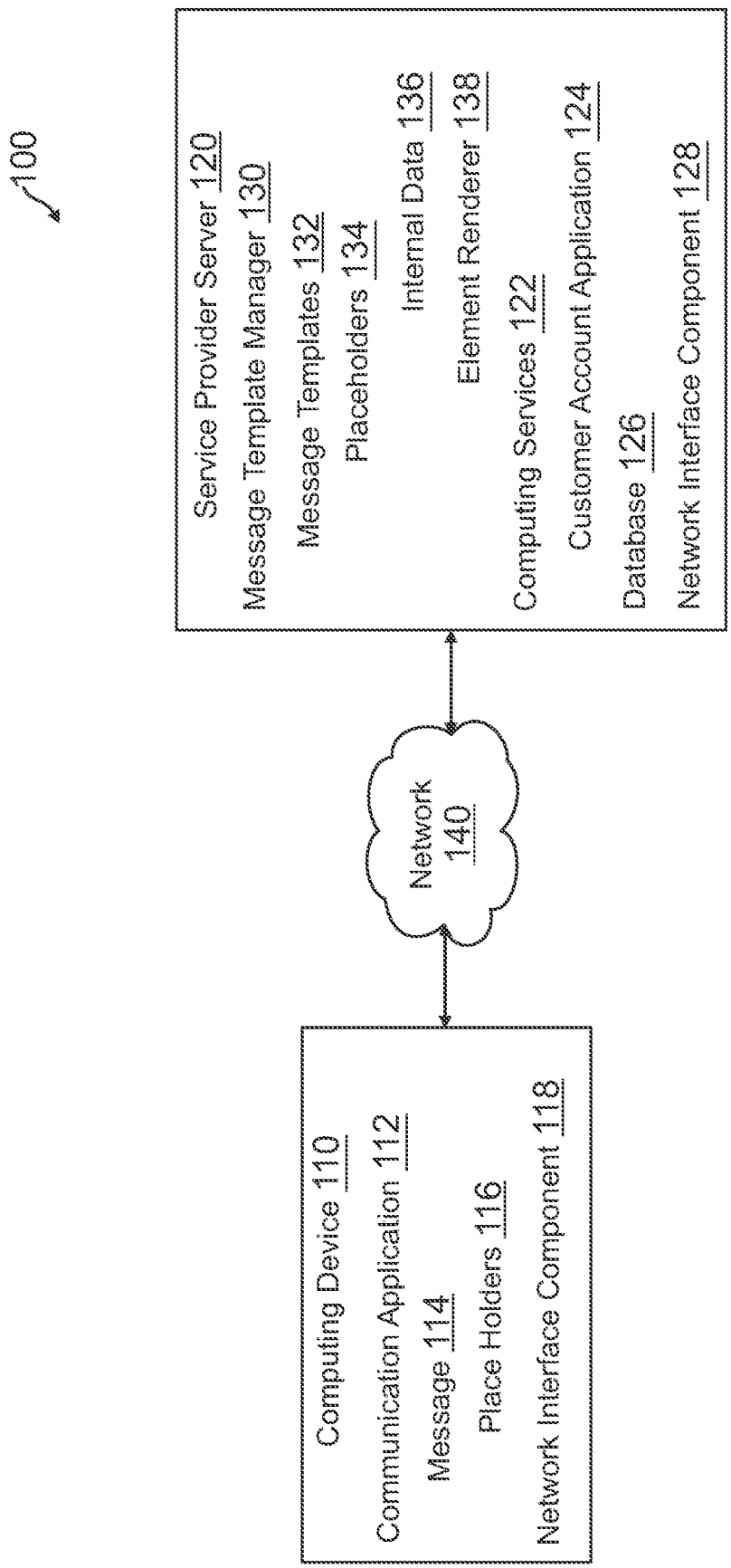
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for message data placeholders for replacement in data elements with stylized components during message communications. Systems suitable for practicing methods of the present disclosure are also provided.

In service provider systems, such as credit provider systems and other financial service providers, electronic communications, such as emails, instant messages, chat messages, pop-ups, push messages, and the like, may be used to provide communications and information to customers and other users or entities. For example, service providers may include underwriting systems utilized to extend credit or other loans to customers and other entities, such as businesses and companies, based on risk assessment and risk analysis processes performed by the service provider systems. The service provider may also provide an account, credit, and/or expense management system that receives and monitors data for an entity, as well as connects with one or more financial computing systems for access to or communication regarding financial accounts. The service provider may further be utilized for electronic transaction processing, for example, with debit, credit, or other payment card transactions, direct debit/credit through automated clearing house (ACH), wire transfers, gift cards, and other types of funding sources that may be issued to the entity by the service provider and/or other financial service providers (e.g., banks). A networked system and provider may include a framework and architecture to provide payment gateways, billing platforms, eCommerce platforms, invoicing, and additional services to users, customers, businesses, and/or other entities via applications. Such services may require the use of communications to users through electronic messages that include content including text data, images or graphics, and other data that may be added to one or more fields and/or elements. By adding content to messages, users may be informed of and/or engage in use of computing services and other information provided by the service provider.

However, addition of content and other data to electronic communications opens the service provider up to risk and potential for abuse by malicious users, compromised systems and devices, and the like. In this regard, the service provider may utilize message templates with message data placeholders to load and/or add content to messages when generated, sent, received, and/or displayed. For example, a user, such as an internal member of a team, may want to send a communication to external users. One or more user interfaces (UIs) may be accessed by a system, tool, and/or platform to generate emails, which may include message templates for a message header, subject line, body, signature block, footer, and the like. Insertable in such message fields and/or elements may be message data placeholders, which may reference customized and stylized components. These components may be designed by the service provider and may be reviewed and approved for addition to a library of available components, which may be referenced for loading using their identifier, pathway, or the like. Further, with such message elements, text or other static data may be added that may be reviewed for compliance with policies, laws, regulations, and the like automatically by a text data parser and analyzer.

The message may be created using such a template with selected placeholders, component identifiers, and other added data. Thereafter, when the message generated is to be sent, transmitted, and/or loaded and displayed on another device, the placeholders in the template may be identified and the corresponding content loaded from their sources based on their identifiers. Where data and/or data source identifiers are unknown or reference external data, such data may be prevented from being loaded, as well as replaced with plaintext or data identifiers/links, in order to secure the message from malicious activity and actions. As such, electronic messages may be created in a more secure manner with faster and more convenient access to and addition of stylized components for message customization.

In this regard, when providing computing services to users and/or other entities, applications, websites, and digital platforms may be used by service providers to provide convenient UIs to interact with computing services, platforms, and data of the service provider, including through electronic messages and communications. For example, a credit and underwriting provider system may offer services, software, online resources and portals, and infrastructure used to provide underwriting for the entity's (e.g., individual users, a business or company, etc.) available credit or loans, as well as operations for expenses, purchases, and other financial transactions. Initially, the entity may be onboarded by providing necessary documents to verify the entity's identity and/or business standing, such as incorporation documents, EIN, tax status and/or documents, and the like. In order to be processed for credit underwriting, the entity may further be required to provide certain data regarding the entity's financial status, accounts, and balances, such as initial seed money, investments, and global available balance(s) that may be used for repayment of extended credit or loans. In this regard, the entity may provide access or a link to, such as through an integration with one or more banking systems utilized by the entity, one or more available balances of funds.

Once onboarded for credit and/or payment services, one or more payment instruments may be issued to users or employees of the entity, including sales, management, information technologies, or other users, such as, contractors, affiliates, or owners (hereinafter referred to generally as users or employees). Thus, the service provider may further provide computing services associated with payment instrument creation, management, and the like. The payment instruments may correspond to various types of payment cards and/or account identifiers, which may be issued by the service provider system or by an associated partner (e.g., an issuing bank that provides credit cards or other financial instruments). During the course of business, an employee may engage in commerce with one or more merchants using a payment instrument, such as by making an in-person (e.g., at a merchant location or store) or online purchase from the merchant. Thus, the user may request electronic transaction processing through the account number or payment instrument identifier(s) provided to the user. Merchants (e.g., a seller or payment receiver, such as a business, fundraiser, healthcare provider, landlord, etc.) may correspond to any person or entity selling goods and/or services (referred to herein as an "item" or "items").

Thus, the service provider may further provide and/or assist with electronic transaction processing services for processing transactions and/or payments for users and entities using the provided payment instruments. When processing a payment, the service provider system may receive transaction data for the payment request from the payment network, for example, when the acquirer (e.g., the acquiring bank for the merchant that processes the payment instrument provided by the user) requests processing with the issuer (e.g., the issuing bank of the entity and/or credit provider system that issues the payment instrument). This occurs when the user causes a transaction to be generated, and the merchant generates a total for the transaction request, which the user can pay for by providing a payment instrument to the merchant. After receiving the payment instrument, the merchant may cause a payment request to be generated for payment of the transaction. In various embodiments, the user may be required to enter additional checkout information, such as a name, delivery location, or other personal or financial information that may be included in the transaction data for the transaction. In some cases, the payment instrument may previously be tokenized by the expense management system in order to further protect from fraud, where the digital token allows for backend identification of the payment instrument to the issuer and/or expense management system without exposing payment credentials.

The service provider system may also provide services through an electronic data processing framework that integrates with a payment network and/or computing system of a financial service provider at a point that allows for real-time data acquisition and/or periodic data retrieval and/or updating of available balances for financial accounts of the entity. For example, integration of the framework at a network node or point at or between an issuing and/or acquiring bank for one or more payment networks may allow for data about accounts and balances for an entity to be received in real-time, and thus the framework may perform real-time data processing. The data for financial accounts, balances, and/or transactions may also be acquired at certain intervals, such as from a pull and/or retrieval for the request from the corresponding banking system for the entity. Additionally, the system's framework may integrate with one or more client devices (e.g., personal computers, mobile devices, etc.), online scheduling resources, personnel management systems, and/or enterprise business software to receive data for an entity that is associated with financial accounts, balances, and/or processed transactions. The payment networks may correspond to resolution networks for payment processing using an account identifier, payment card, or the like during electronic and in-person transaction processing. These payment networks and financial service providers (e.g., banks and banking computing systems) may be selected and integrated with each other in order to determine and process account and/or transaction data.

With such computing systems of service providers, communications and messages may be provided and exchanged to utilize, request and/or process data, provide access to and use of computing services, and/or inform users of relevant information, alerts, notifications, and the like. Communications and electronic messages may be accessed through messaging accounts, such as email and/or user accounts, with corresponding applications, such as a mobile application, email or messaging application, rich Internet applications, web browsers and web applications, websites, and the like that may be accessible by users through different devices. In this regard, electronic messages and other communications to users and other entities in digital form via these applications, platforms, and devices may include different added content and other data. Certain data may generally be safe or unlikely to contain malicious code, links, or data that is not transparent or easily identified, such as text data. However, other content in messages may include banners, links, selectable objects, inserted or attached images and graphics, animations, and the like, which may be more prone to abuse and/or require approval. As such, conventionally, such content may not be standardized, stylized, and/or reviewed for approval and security. Therefore, the service provider may provide a system and platform that adds, inserts, or injects data for specific components to messages and message elements using placeholders in message templates.

In this regard, a user wishing to transmit an electronic communication (generated, revised, or forwarded by the user), such as an email, to another user, group of users, business entity, or the like may utilize a framework including one or more UIs for message generation and content addition or insertion in such messages. Such framework may allow for building of electronic communications using components from a library or database of available and approved components, which may be stylized and generated by a designer but shared across the service provider and/or one or more of the teams for the service provider to standardize the components visualization, presentation, and/or content. In this regard, each stylized component may have a corresponding ID or pathway allowing for linking to, retrieval, and/or loading/injecting of the component to an electronic message or other communication.

To add one or more components to messages, message templates may be used that specify the layout, content, and fields or other elements within the message, such as whether the message includes a title, body, header, footer, signature, attachment, etc., and well as the messages alert, layout of such elements, and/or base content in such elements. Further, insertable in each message element may be one or more message data placeholders, which may correspond to a flag and/or code syntax (e.g., executable logic that may be used to perform a computing action or operation) to cause the framework, when parsing or analyzing the message elements, to replace the placeholder with data for one or more of the stylized components from a corresponding data source. As such, when generating the message, the user may select a template and one or more placeholders, as well as corresponding components and/or data added by the placeholders where not previously specified. Thereafter, when the message is generated for sending or sent (e.g., transmission is requested), the framework and/or system for message communications may process and parse the message for the message template, identify placeholders and elements based on the message template, and thereafter insert, add, or otherwise provide the corresponding data from a data source in place of the corresponding placeholders in the message. This allows for the stylized components to be quickly added in a standardized manner without requiring manual efforts of the user to add and configure, while maintaining security by ensuring that the components and data are from internal trusted sources and have been reviewed/approved.

However, where the message may include content, components, data, and/or links to unapproved and/or unknown data sources, such as where a link or banner has been added without the user of a placeholder or using a placeholder with an ID or link to an external untrusted data source, the framework may prevent addition, transmission, and/or loading of such data. For example, a message may be created by a user (e.g., intentionally by malicious users or unintentionally by compromised systems or devices) with included data that is not added via a placeholder, which may be excluded from message generation and/or transmission. Further, placeholders may require an identification of a valid ID or pathway to internally stored component data such that external untrusted data may not be added using such placeholders. As such, the framework may further protect generated emails from potentially harmful or unapproved content from being distributed in electronic messages.

In this manner, a service provider may provide fast and coordinated communications with customized and stylized components in electronic messages, while retaining a secure and robust process and framework for creating, updating, and authorizing these components for usage in electronic messages. This allows for a better user experience (UX) by allowing for stylized elements to be automatically added in a standardized manner across the service provider while preventing adding and/or displaying of content in messages and UIs that has not been approved and reviewed for security and compliance (e.g., malicious added content or other data). Thus, electronic message generation and transmission technology may be improved using the processing framework, message templates, and data placeholders for insertable data discussed herein.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a customer or client's computing device 110 and a service provider server 120 in communication over a network 140. A user (not shown) may correspond to an employee, contractor, shareholder, or other suitable person of a company (not shown and generally referred to herein as an "employee") associated with computing device 110, which may use computing device 110 to access and utilize the computing services of service provider server 120 via a communication application 112 on computing device 110. Service provider server 120 may provide operations to generate, transmit, and display electronic messages, such as emails and other communications, using placeholders in message templates for stylized components and other data that has been reviewed and approved for use and standardization, as discussed herein.

Computing device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Computing device 110 may be utilized by an employee of an entity or company that employs one or more users, for example, to utilize communication application 112 with service provider server 120. For example, in one embodiment, computing device 110 may be implemented as a personal computer (PC), telephonic device, a smart phone, laptop/tablet computer, wristwatch with appropriate computer hardware resources, eyeglasses with appropriate computer hardware (e.g., GOOGLE GLASS @), other type of wearable computing device, implantable communication devices, and/or other types of computing devices capable of transmitting and/or receiving data. In this regard, computing device 110 includes one or more processing applications which may be configured to interact with service provider server 120 via communication application 112 for use of computing services, which may include transmitting and receiving electronic messages. Although only one communication device is shown, a plurality of communication devices may be used and function similarly.

Computing device 110 of FIG. 1 includes communication application 112 and a network interface component 118. Communication application 112 may correspond to executable processes, procedures, and/or applications with associated hardware. In other embodiments, computing device 110 may include additional or different modules having specialized hardware and/or software as required.

Communication application 112 may be implemented as specialized hardware and/or software utilized by computing device 110 to access and/or utilize services provided by service provider server 120, such as underwriting for credit, onboarding and/or management of an account, electronic transaction processing, and/or usage of other services with service provider server 120 by an entity associated with computing device 110 (e.g., an organization, business, company, or the like including startup companies that may require credit services). For example, a user associated with the entity may utilize computing device 110 to provide data and/or request data processing for data from service provider server 120. In this regard, communication application 112 may correspond to software, hardware, and data utilized by a user associated with computing device 110 to enter, store, and process data with service provider server 120, which may include financial and/or transaction data. In combination with and/or separately, communication application 112 may be used to send and receive electronic messages, which may include components rendered in place of data element placeholders in fields and other elements of messages having message templates. In other embodiments, the services may further or instead include email and messaging, social networking, microblogging, media sharing and/or viewing, streaming, and/or other data processing services.

In various embodiments, communication application 112 may include a general browser application configured to retrieve, present, and communicate information over the Internet (e.g., utilize resources on the World Wide Web) or a private network. For example, communication application 112 may correspond to a web browser, which may send and receive information over network 140, including retrieving website information, presenting the website information to the user, and/or communicating information to the website, including payment information. However, in other embodiments, communication application 112 may include a dedicated software application of service provider server 120 or other entity. Communication application 112 may be configured to assist in onboarding for accounts, establishing and maintaining the accounts, engaging in electronic transaction processing, transmitting and receiving electronic messages, and other computing services provided by service provider server 120.

In this regard, features using these computing services may be provided for sending and receiving electronic messages, which may include message 114 having placeholders 116 provided in fields or other elements of a message template for the message (e.g., header, footer, body, subject line, signature block or line, etc.). Message 114 may correspond to an email, instant message, chat message, pop-up, push message, or the like, which may be requested to be created and sent to another user, or may be received from another user or entity and requested to be displayed and rendered. As such, placeholders 116 may include references, identifiers, or pathways that designate data, such as stylized components, for addition to and/or presentation in message 114. Based on such requests to internal or external data sources, the data may be added and/or rendered or prevented from such addition/rendering in order to provide faster and standardized message components, layouts, and presentations with secure and approved data, as discussed herein.

Computing device 110 may further include a database stored in a transitory and/or non-transitory memory of computing device 110, which may store various applications and data and be utilized during execution of various modules of computing device 110. Thus, the database may include, for example, identifiers such as operating system registry entries, cookies associated with communication application 112, identifiers associated with hardware of computing device 110, or other appropriate identifiers, such as identifiers used for payment/account/device authentication or identification. The database may include received messages and/or data for addition to messages, which may require submission to and/or approval of prior to transmitting and/or rendering in messages.

Computing device 110 includes at least one network interface component 118 adapted to communicate with service provider server 120 and/or another device or server over network 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices.

Service provider server 120 may be maintained, for example, by an online service provider, which may provide account, payment instruments and credit, expense management, and/or other computing services to companies, businesses, and other entities. In this regard, service provider server 120 includes one or more processing applications which may be configured to interact with computing device 110, and/or other devices or servers to facilitate transmission and rendering of electronic messages and corresponding data, as well as management of stylized components and other data for addition to electronic messages. In one example, service provider server 120 may be provided by BREX®, Inc. of San Francisco, CA, USA. However, in other embodiments, service provider server 120 may be maintained by or include other types of credit providers, financial services providers, and/or other service providers, which may provide applications and computing services to entities.

Service provider server 120 of FIG. 1 includes a message template manager 130, computing services 122, a database 126, and a network interface component 128. Message template manager 130 and computing services 122 may correspond to executable processes, procedures, and/or applications with associated hardware. In other embodiments, service provider server 120 may include additional or different modules having specialized hardware and/or software as required.

Message template manager 130 may correspond to specialized hardware and/or software to establish, configure, change, and/or update stylized components and other data to be inserted, added, and/or rendered in electronic messages, as well as compose, generate, transmit, and/or render electronic messages using a database (e.g., database 126) of such assets and data for stylized components and the like. In some embodiments, the computing services may be provided by and/or in addition to computing services 122, and may be used with electronic transaction processing and payment instruments associated with a bank account, extended credit, and/or funding of the company, such as one or more company credit cards. Computing services 122 may further provide management for those issued payment instruments and additional funds/accounts of the company, for example, through expense management processes. In this regard, an entity may first establish an account with computing services 122 by providing company or entity data and onboarding with service provider server 120. The company or entity data may include articles of incorporation, tax status and/or IRS EIN request and confirmation data, and other information that may be utilized to verify a company, business, organization, or charity is proper, valid, and not fraudulent. Such information may further include bank account and funding information, such as verified funding from investors, available funds in a bank or financial account, and the like.

Service provider server 120 may onboard the entity associated with computing device 110 using computing services 122 for services provided by service provider server 120. This may include providing account and/or expense management services, such as based on expenses and balances available to the entity. Further, credit may be extended to the entity based on entity financial data. In this regard, service provider server 120 and/or another issuing entity may provide a payment instrument that is managed by computing services 122. For example, service provider server 120 may issue one or more credit cards for employees of the entity, which may correspond to a real or virtual credit card or other types of payment instruments and instrument identifiers that may be used for company payments. Thus, the computing services provided by software applications, websites, and other platforms and online resources of service provider server 120 may include onboarding for accounts, establishing and maintaining the accounts, engaging in electronic transaction processing, as well as email and messaging, social networking, microblogging, media sharing and/or viewing, streaming, and/or other data processing services.

When using such computing services and/or engaging with other users, message template manager 130 may be used for creating and/or requesting display/rendering of a message, such as message 114 on computing device 110. Message template manager 130 may further provide operations to deploy, rollout, and/or provide data, templates, and placeholders for message creation and/or rendering. For example, message template manager 130 may be used to establish and utilize message templates 132, which may correspond to layouts and elements for different messages and/or message types or categories, which may be used for message creation and/or composition. For example, message templates 132 may be used for specific messages sent to different users, customers, or entities, such as password reset, balance updates, fraud alerts, and similar messages. Message templates 132 may further include placeholders 134 for internal data 136, which may be added in places using the elements in message templates 132 for stylized components and other data for internal data 136. Internal data 136 may be referenced by placeholders 134 using IDs, pathways, or other links and descriptors allowing for retrieval from a database, such as database 126.

In this regard, message template manager 130 may be accessed and a message (e.g., message 114) composed and/or created, or the message may be received and processed for rendering. When created and/or accessed for display, the message may include a corresponding one of message templates 132 having one or more of placeholders 134 referencing data from internal data 136. Thus, as the message is generated for transmission or transmitted, data from internal data 136 may be added to the message based on placeholders 134 in message templates 132. Where data in the message further includes or references to data from external sources or that is not recognized from internal data 136, such data may be prevented from being added and/or transmitted. Similarly, where a message may be received and data has not yet been added but is referenced by one or more of placeholders 134, internal data 136 may be rendered in such elements of a corresponding one of message templates 132 and/or prevented from being rendered when the data source is untrusted or not recognized. These operations, components, and electronic messages are discussed in further detail with regard to FIGS. 2A-4 below.

Computing services 122 may correspond to specialized hardware and/or software to allow entities (e.g., the entity associated with computing device 110) to provide account services, process and provide credit or loan extensions, process financial transactions using one or more company credit cards or other financial instruments, and/or provide expense management systems. As previously discussed, computing services 122 may correspond to one or more services provided by service provider server 120 to an entity, such as the entity associated with computing device 110. In some embodiments, the services may include account and/or credit services. In such embodiments, computing services 122 may include underwriting systems and models, which may extend credit or other loans based on parameters for an entity. In further embodiments, computing services 122 may also provide expense management services, such as those that may integrate with an entity's expense, payroll, human resources, business panning, and the like to provide enterprise resource planning (ERP) services.

In some embodiments, computing services 122 may be used to process transaction data, which may include information about the transaction (e.g., cost, items, additional fees including tax or tip, merchant identifier, description, and the like) and an identifier for the entity associated with computing device 110 and/or the used payment instrument (e.g., credit card number for the credit account). Computing services 122 may then utilize one or more payment networks to process the transaction, such as by issuing a payment over a payment network and/or by requesting payment by a credit issuing bank or institution to the merchant and/or acquiring bank or institution. In other embodiments, the credit card or payment network may be managed by another entity and/or payment network, where an integration by service provider server 120 with the network may allow for acquisition of transaction data by computing services 122 in real-time or substantially in real-time. Computing services 122 may further issue transaction histories and provide accounting and recordation of transaction data, such as with the ERP resources provided by computing services 122. Such computing service use, messaging, and/or interaction with by users may be facilitated using electronic messaging, where message generation, transmission, and/or rendering may be performed using message template manager 130, as discussed herein.

Additionally, service provider server 120 includes database 126. As previously discussed, the user, entity, and/or entity corresponding to computing device 110 may establish one or more accounts with service provider server 120. Accounts in database 126 may include customer credit accounts and other entity information, such as name, address, additional user financial information, and/or other desired entity data. Further, database 126 may include data that may be stylized and added to messages in a shared and/or standardized manner across one or more entities, customers, and/or the service provider, such as components for electronic messages including internal data 136.

In various embodiments, service provider server 120 includes at least one network interface component 128 adapted to communicate with computing device 110 and/or other devices or servers over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices.

Network 140 may be implemented as a single network or a combination of multiple networks. For example, in various embodiments, network 140 may include the Internet or one or more intranets, landline networks, wireless networks, and/or other appropriate types of networks. Network 140 may correspond to small scale communication networks, such as a private or local area network, or a larger scale network, such as a wide area network or the Internet, accessible by the various components of system 100.

Figure 2A:
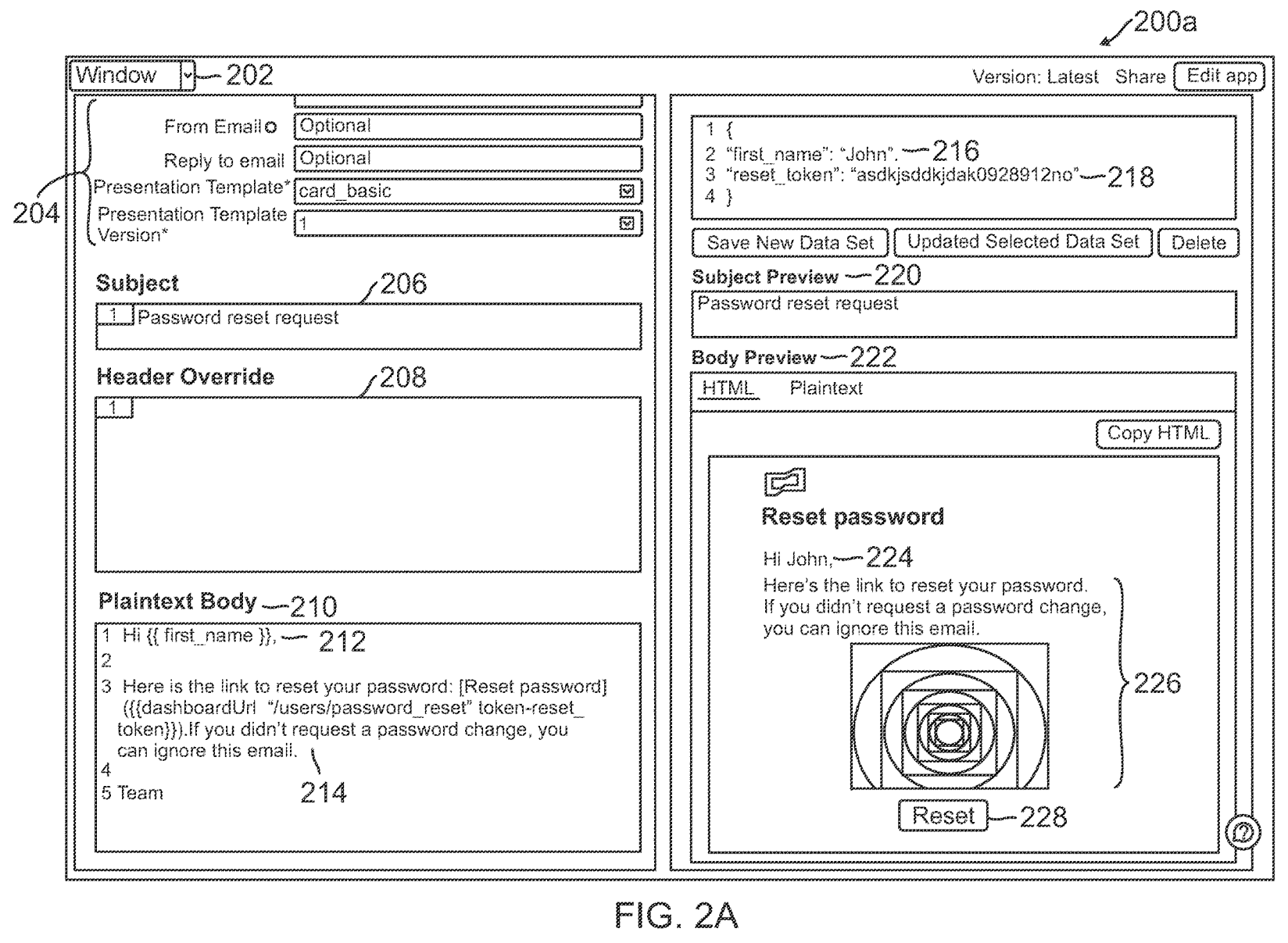
Figure 2B:
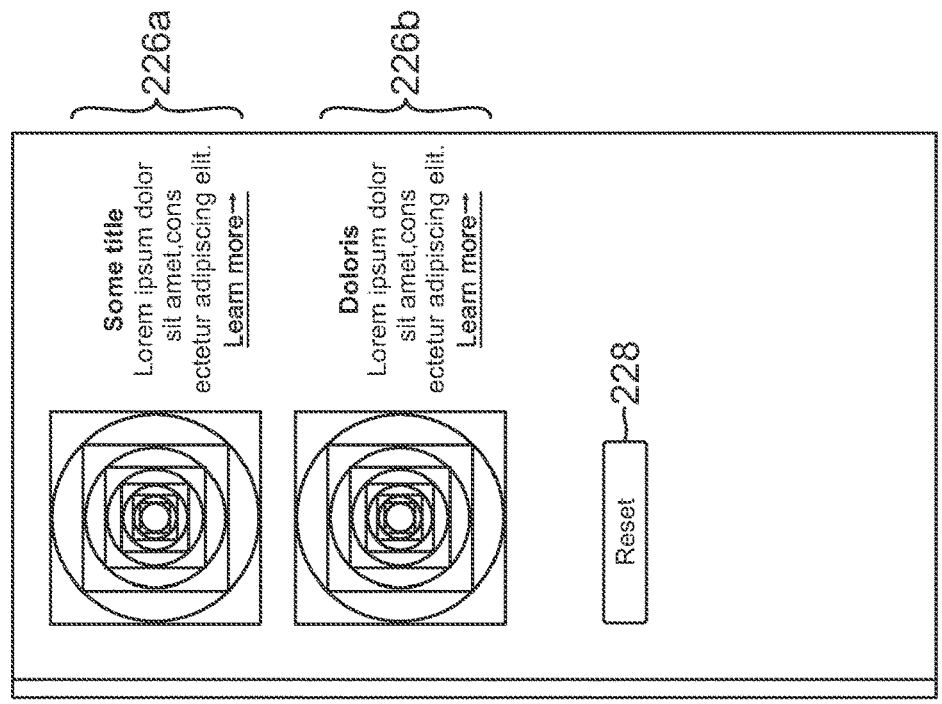

FIGS. 2A and 2B are exemplary user interfaces 200a and 200b for establishing a message having message data placeholders used to load data in data elements with stylized components, according to an embodiment. User interfaces 200a and 200b of FIGS. 2A and 2B include displayable content graphics, text, links, and other data and/or UI elements that may be added to and/or rendered in electronic messages sent from or on behalf of a service provider, or using computing services provided by such service provider. In this regard, user interfaces 200a and 200b may be displayed by a computing device via an application, such as by computing device 110 using communication application 112 in system 100 of FIG. 1, when creating and/or composing an electronic message to have data in message elements added from placeholders referencing such data.

For example, computing device 110 may be used to access one or more computing resources and/or services provided by service provider server 120 (e.g., using computing services 122, such as via communication application 112). This may be used to construct, compose, and create messages that are then procedurally generated, such as using the message template with inputs for text, links, placeholders, and IDs or pathways to retrievable data for stylized components and other data to be replaced and added in place of such placeholders. As such, a window 202 in interface 200a may include options for constructing an email, which may be used to send a particular message or notification to another user, such as a customer (as well as groups of users, employees of an entity, etc.). For example, in window 202, an email may be created for transmission for a password reset process.

In window 202, a template may be displayed to construct the email or other electronic message, which may be selected from template selection options 204. Template selection options 204 allow for selection of different styles and elements for the email, as well as automatic or form content, text, links, process, and/or other data to add, such as a notification of a password reset and an automatically created secure link to a webpage to perform password reset. As such, selection of options from template selection options 204 further allows population of and user input to additional message fields or elements, such as a subject 206, which in addition to any form text or data, additional subject data may be added. To a header override 208, additional header information may be added, which may then be automatically added and populated with one or more password reset request emails to be sent.

In this regard, with an element or field for a body 210 of the email, additional text may be added by the user, which may include placeholders referencing stored or internal data, such as stylized components, for addition to the email when transmitted. Thus, in body 210, a name placeholder 212 may correspond to automatic name data replacement in body 210 with a name of a user requesting the password reset email and/or corresponding to the account requesting the password reset. A data element placeholder 214 may be provided having syntax, code, or other logic that causes replacement of data element placeholder 214 with corresponding data from a data source identified in data element placeholder 214. To do so, syntaxes for name placeholder 212 and data element placeholder 214 may be set with name data 216 and component data 218 for a data set. This configures replacement of name placeholder 212 and data element placeholder 214 with name data 216 and component data 218, respectively. To preview the email, a subject preview 220 and body preview 222 may be shown in interface 200a, where body preview 222 includes, in a body of the email, a name greeting 224 corresponding to name placeholder 212 and name data 216 with a stylized component 226 and reset button 228 corresponding to component data 218 that has been added in place of data element placeholder 214.

Once generated, the email may be stored for later transmission or immediately transmitted. For example, the password reset email may now be used for future password reset requests, where the email may be generated, and data added/rendered in the email on each password reset request by users or customers of an entity. The email may also or instead be immediately sent for a password reset request that exists or has been submitted. On each transmission, the placeholders, such as data element placeholder 214, may be parsed and identified using the message template and placeholder syntax, where IDs, links, or pathways to internal data may be accessed to replace such placeholders. Where the data is internal and valid, the data may be added. However, IDs, links, or pathways to external and/or untrusted data sources may be prevented from being added or rendered in the email.

In user interface 200b, body 210 with name placeholder 212 and data element placeholder 214 are shown expanded for a main content 230 having content and placeholders 232. Content and placeholders in main content 230 are expanded to have additional placeholders to corresponding data that may be added to an email. For example, user interface 200b includes different stylized components 226*a* and 226*b*, which may be separately added to have different effects, text, links, and the like depending on the desires of the outlook for the corresponding electronic message. Each of stylized components 226*a* and 226*b* may be presented with a similar reset button 228, which may link or initiate a process to reset a password. As such, user interface 200*b* shows different options selectable for stylized components added to emails using placeholders in message templates.

Figure 3B:
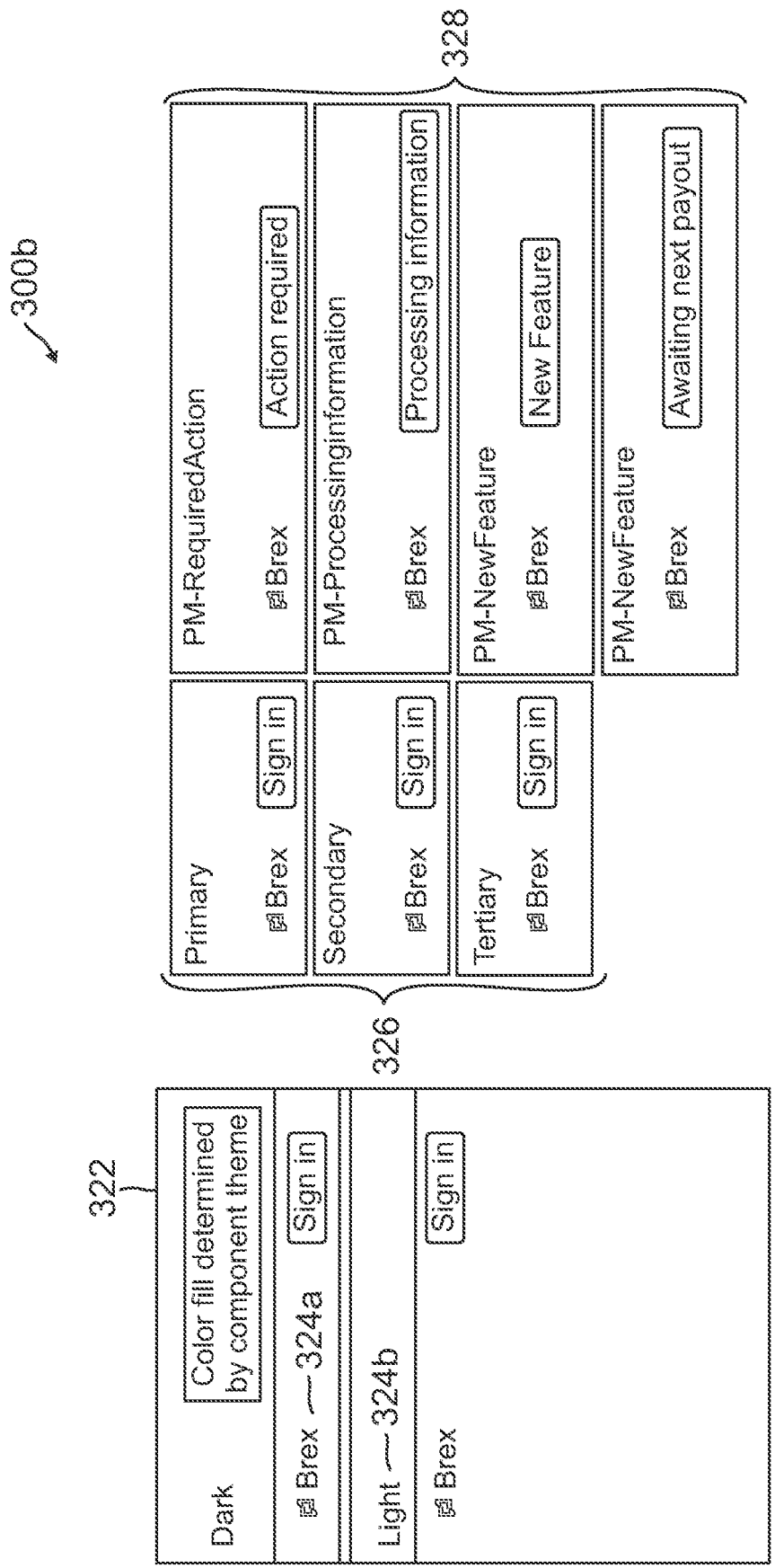

FIGS. 3A and 3B are exemplary diagrams 300*a* and 300*b* for menus and menu options for establishing an electronic message having message data placeholders used to load data in data elements with stylized components, according to an embodiment. Diagrams 300*a* and 300*b* may include representative menus to select message templates and message data for input in place of placeholders on message generation and/or rendering by message template manager 130 of service provider server 120 discussed in reference to system 100 of FIG. 1. A UI may be provided by computing device 110, such as through communication application 112 when presenting the menus and menu options to create and/or compose a message using the menus and menu options from diagrams 300*a* and 300*b*.

In this regard, diagram 300*a* include a menu option where a message type 302 may be selected, such as an email with an "action required" type alert or notification. A template version 304 for the message template may also be selected, including an information or action required for the message template that may affect message type and generate a layout with message elements in a corresponding UI or the like for message creation. In diagram 300*b*, exemplary types of stylized components are shown that may be added to electronic messages and/or used to stylize such messages based on message templates and placeholders. For example, in theme components 322, a dark theme 324*a* and a light theme 324*b* are shown, where selection and/or identification in a placeholder or template for message body or the like may cause a corresponding effect with graphics, data, and visuals of the electronic message to change. Login components 326 may allow for different login or sign in buttons to be displayed with different colors and/or fills, while notification alerts 328 allow for the electronic message to be associated with a specific alert when generated using such stylized components.

Figure 4:
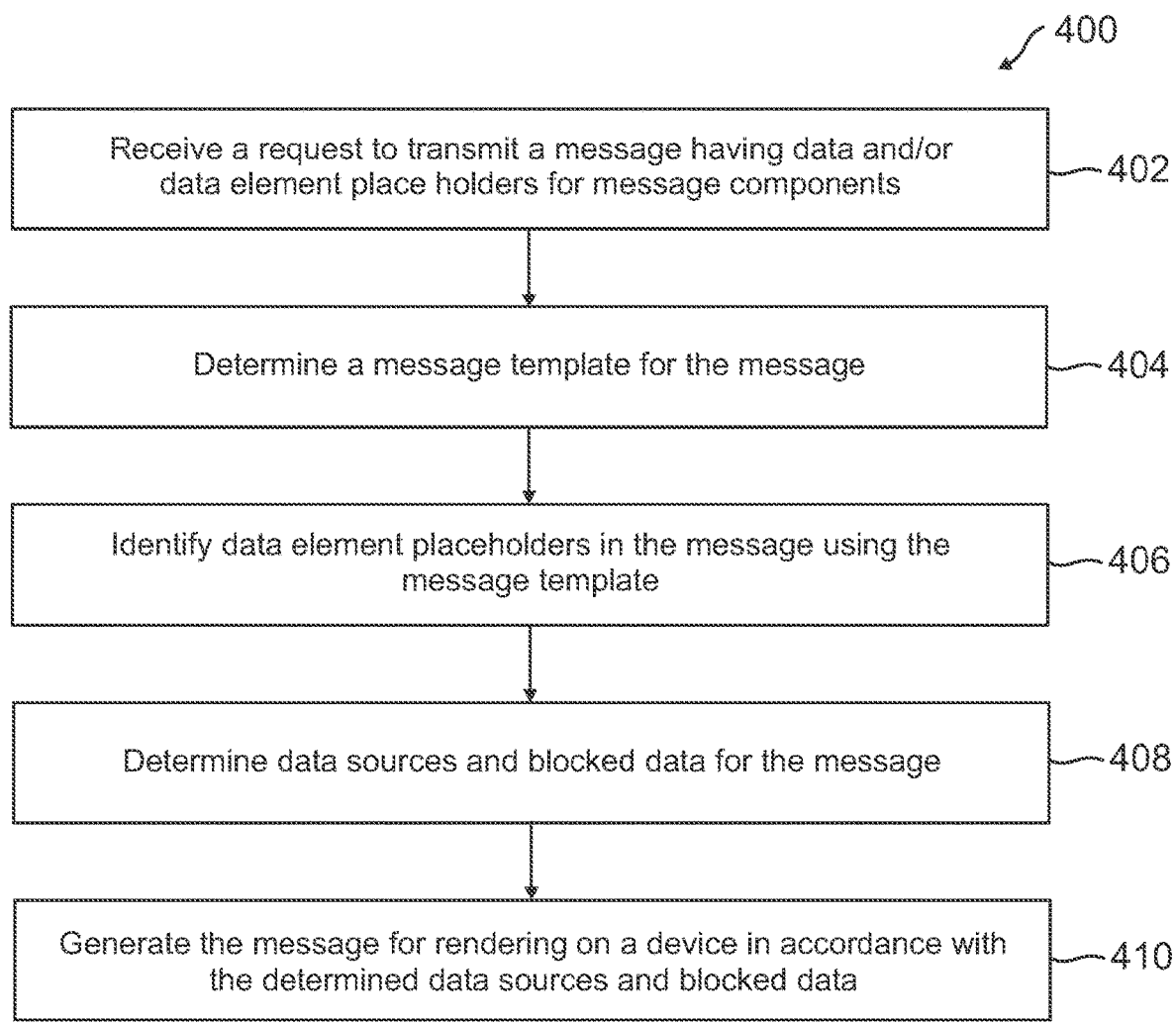
FIG. 4 is an exemplary flowchart for message data placeholders for replacement in data elements with stylized components during message communications, according to an embodiment.

FIG. 4 is an exemplary flowchart 400 for message data placeholders for replacement in data elements with stylized components during message communications, according to an embodiment. Note that one or more steps, processes, and methods of flowchart 400 described herein may be omitted, performed in a different sequence, or combined as desired or appropriate.

At step 402 of flowchart 400, a request to transmit a message having data and/or data element placeholders for message components is received. The message may be requested to be transmitted during or after creation of the message where a message template is used to create the message and add placeholders for corresponding data with data source(s) to portions of the message. Such data may be used to stylize the message while utilizing standardized and/or approved components so that messages may be uniform and include approved and not malicious or potentially harmful data. In some embodiments, instead of the request being to transmit the message, the request may be to render or display a received message, such as when the service provider's system is receiving an electronic message for rendering that includes data in and/or data element placeholders in fields or other elements of the message.

At step 404, a message template for the message is determined. After receiving the message, the message template may be determined to identify the fields and other elements of the message, where data including text and insertable stylized components for placeholders may be added. As such, the message template may correspond to an overall layout and presentation of the message, and may be used to structure the message's elements for message generation, transmission, and/or rendering. At step 406, data element placeholders in the message are identified using the message template. Using the message template, different fields and other elements of the message may be determined, which may allow for identification of syntax corresponding to the data element placeholders in the elements of the message. The syntax may be coded, scripted, or written in text, code, or the like that causes a scripter, parser, or the like to identify when a placeholder is called and utilized in a message element.

At step 408, data sources and blocked data is determined for the message. Within the placeholders may be corresponding IDs, paths, links, or the like, which may make reference to and allow for data calls to be made to one or more data sources for the corresponding data to be loaded to the electronic message. In this regard, the placeholders may be replaced with corresponding data when the data is trusted and/or from an internal data source. However, when not from such a source, the data may be blocked from being added to prevent malicious or harmful data from being added to messages. At step 410, the message is generated for rendering on a device in accordance with the determined data sources and blocked data. Based on the retrieved data from trusted data sources, the data may be rendered in the electronic message. However, data from untrusted data sources may not be added and/or rendered and may instead be replaced in corresponding elements with clear text or no data to prevent transmission of the malicious or harmful data. Further, an alert may be generated of such untrusted data prior to message transmission to allow for message restructuring and/or recreation.

Figure 5:
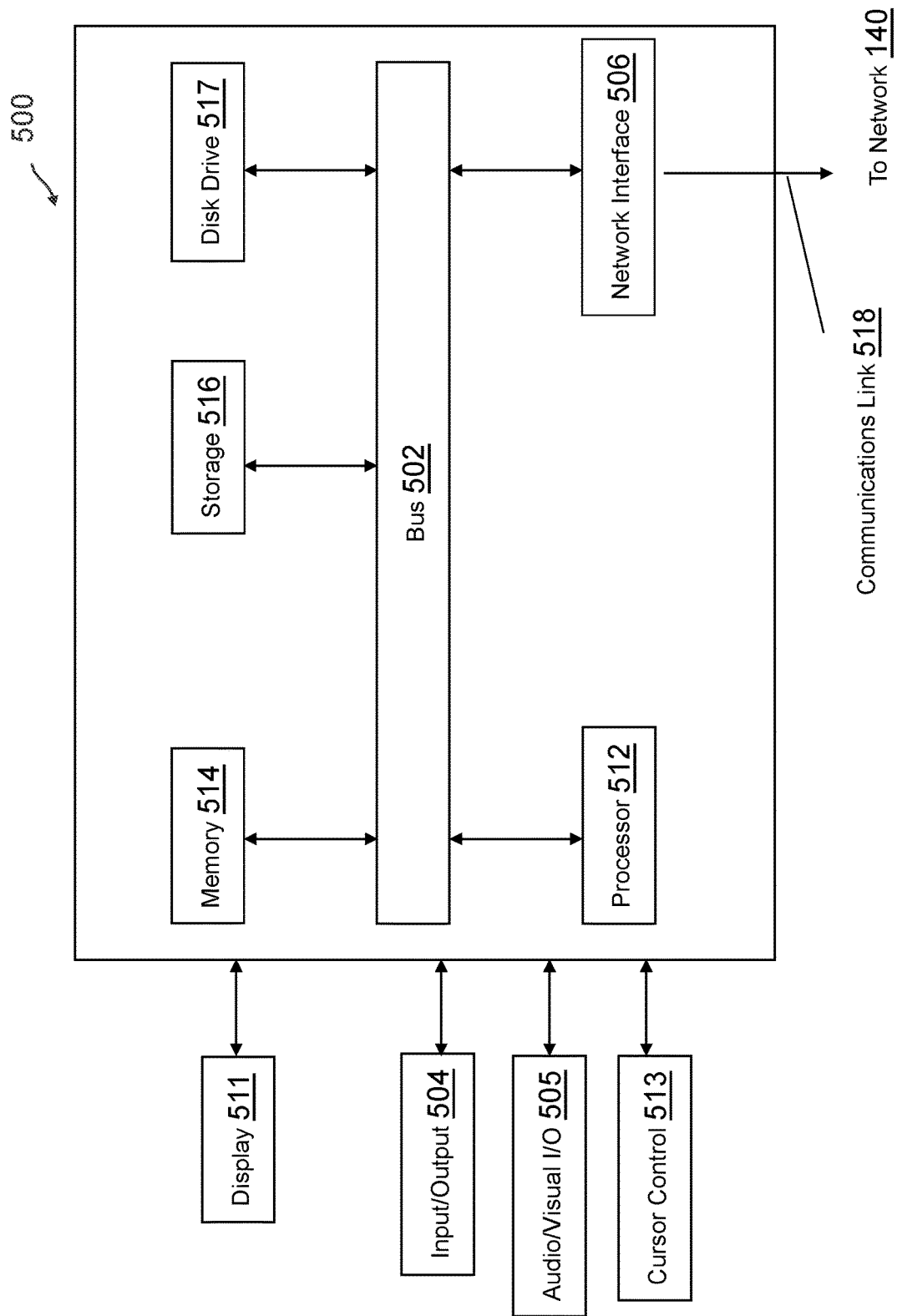
FIG. 5 is a block diagram of a computer system suitable for implementing one or more components in FIG. 1, according to an embodiment.

FIG. 5 is a block diagram of a computer system 500 suitable for implementing one or more components in FIG. 1 and/or performing one or more steps in FIG. 4, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a non-transitory memory; and
    one or more hardware processors coupled to the non-transitory memory and configured to read instructions from the non-transitory memory to cause the system to perform operations comprising:
        receiving a request to transmit an electronic message, wherein the electronic message has a data element placeholder for first data presentable in the electronic message;
        determining a message template for the electronic message;
        identifying, based on the electronic message and the message template, the data element placeholder in the electronic message;
        determining the first data for the data element placeholder based on text data in the data element placeholder and a first data source for the first data;
        determining that the electronic message includes an additional element for second data presentable in the electronic message;
        identifying a second data source for the second data;
        determining that the second data source is external from a service provider corresponding to the system;
        preventing, based on the determining that the second data source is external from the service provider, a transmission or a rendering of the second data in the additional element; and
        generating, responsive to the request to transmit the electronic message, the first data in the electronic message in place of the data element placeholder for a rendering of the electronic message.

2. The system of claim 1, wherein the operations further comprise:
    providing additional text data associated with the second data in place of the second data in the additional element.

3. The system of claim 1, wherein the second data source corresponds to an unsecured source, and wherein the operations further comprise:
    determining that the unsecured source uses an external application programming interface (API) for requesting the second data for the additional element, and wherein the preventing the transmission is further based on the determining that the unsecured source uses the external API.

4. A system comprising:
a non-transitory memory; and
one or more hardware processors coupled to the non-transitory memory and configured to read instructions from the non-transitory memory to cause the system to perform operations comprising:
receiving a request to transmit an electronic message, wherein the electronic message has a data element placeholder for first data presentable in the electronic message;
determining a message template for the electronic message;
identifying, based on the electronic message and the message template, the data element placeholder in the electronic message;
providing a user interface (UI) for a submission of stylized components;
reviewing the stylized components for unauthorized content prior to making the stylized components available for inclusion in the electronic message, wherein the stylized components include first data;
determining that the first data is suitable for the data element placeholder based on text data in the data element placeholder and a first data source for the first data; and
generating the first data in the electronic message in place of the data element placeholder for a rendering of the electronic message.

5. The system of claim 4, wherein the stylized components comprise internal data of a service provider generated by one or more designers for the service provider, and wherein the stylized components comprise one of hypertext markup language (HTML) or cascading style sheets (CSS) content insertable in a plurality of electronic messages in place of a plurality of data element placeholders using component identifiers in the plurality of data element placeholders.

6. The system of claim 1, wherein the data element placeholder comprises a field in one of a header, a message body, a signature block, or a footer of the electronic message, and wherein the field includes a placeholder syntax with a data pathway identifier for the first data.

7. The system of claim 1, wherein the electronic message comprises an email, an instant message, or a chat message, and wherein the electronic message is generated by an internal application or an internal user of a service provider associated with the system and transmitted to another internal user or an external user.

8. The system of claim 1, wherein, prior to the receiving, the operations further comprise:
providing at least one menu interface that enables the electronic message having the data element placeholder and a component identifier for the first data to be generated.

9. A method performed by a system associated with a service provider, the method comprising:
receiving a request to transmit an electronic message, wherein the electronic message has a data element placeholder for first data presentable in the electronic message;
determining, by a message template manager, a message template for the electronic message;
identifying, by the message template manager based on the electronic message and the message template, the data element placeholder in the electronic message;
determining, by the message template manager, the first data for the data element placeholder based on text data in the data element placeholder and a first data source for the first data;
determining, by the message template manager, that the electronic message includes an additional element for second data presentable in the electronic message;
identifying, by the message template manager, a second data source for the second data;
determining, by the message template manager, that the second data source is external from the service provider;
preventing, by the message template manager based on the determining that the second data source is external from the service provider, a transmission or a rendering of the second data in the additional element; and
generating, by the message template manager responsive to the request to transmit the electronic message, the first data in the electronic message in place of the data element placeholder for a rendering of the electronic message.

10. The method of claim 9, further comprising:
providing, by the message template manager, additional text data associated with the second data in place of the second data in the additional element.

11. The method of claim 9, wherein the second data source corresponds to an unsecured source, and wherein the method further comprises:
determining that the unsecured source uses an external application programming interface (API) for requesting the second data for the additional element,
and wherein the preventing the transmission is further based on the determining that the unsecured source uses the external API.

12. A method comprising:
receiving a request to transmit an electronic message, wherein the electronic message has a data element placeholder for first data presentable in the electronic message;
determining, by a message template manager, a message template for the electronic message;
identifying, by the message template manager based on the electronic message and the message template, the data element placeholder in the electronic message;
determining, by the message template manager, the first data for the data element placeholder based on text data in the data element placeholder and a first data source for the first data;
providing a user interface (UI) for a submission of stylized components to the message template manager;
reviewing the stylized components for unauthorized content prior to a deployment with the message template manager, wherein the stylized components include first data;
determining that the first data is suitable for the data element placeholder based on text data in the data element placeholder and a first data source for the first data; and
generating the first data in the electronic message in place of the data element placeholder for a rendering of the electronic message.

13. The method of claim 12, wherein the stylized components comprise internal data of a service provider generated by one or more designers for the service provider, and wherein the stylized components comprise one of hypertext markup language (HTML) or cascading style sheets (CSS) content insertable in a plurality of electronic messages in place of a plurality of data element placeholders using component identifiers in the plurality of data element placeholders.

14. The method of claim 9, wherein the data element placeholder comprises a field in one of a header, a message body, a signature block, or a footer of the electronic message, and wherein the field includes a placeholder syntax with a data pathway identifier for the first data.

15. The method of claim 9, wherein the electronic message comprises an email, an instant message, or a chat message, and wherein the electronic message is generated by an internal application or an internal user of a service provider associated with the system and transmitted to another internal user or an external user.

16. The method of claim 9, wherein, prior to the receiving, the method further comprises:
providing at least one menu interface configured to generate the electronic message having the data element placeholder and a component identifier for the first data.

17. A non-transitory machine-readable medium having stored thereon machine-readable instructions executable to cause a machine to perform operations comprising:
receiving a request to transmit an electronic message having a data element placeholder for first data presentable in the electronic message;
determining a message template for the electronic message;
identifying, based on the electronic message and the message template, the data element placeholder in the electronic message;
determining the first data for the data element placeholder based on text data in the data element placeholder and a first data source for the first data;
determining that the electronic message includes an additional element for second data presentable in the electronic message;
identifying a second data source for the second data;
determining that the second data source is external from a service provider corresponding to the machine;
preventing, based on the determining that the second data source is external from the service provider, a transmission or a rendering of the second data in the additional element; and
generating, responsive to the request to transmit the electronic message, the first data in the electronic message in place of the data element placeholder for a rendering of the electronic message.

* * * * *